March 1, 1966  D. GORDON ETAL  3,238,449
PULSE COMPARING DEVICE FOR DIGITAL MEASUREMENT OF SIGNAL SHAPE
Filed Dec. 27, 1961  4 Sheets-Sheet 1

INVENTORS
DAVID GORDON
MALCOLM A. SANBORN

BY 
ATTORNEY

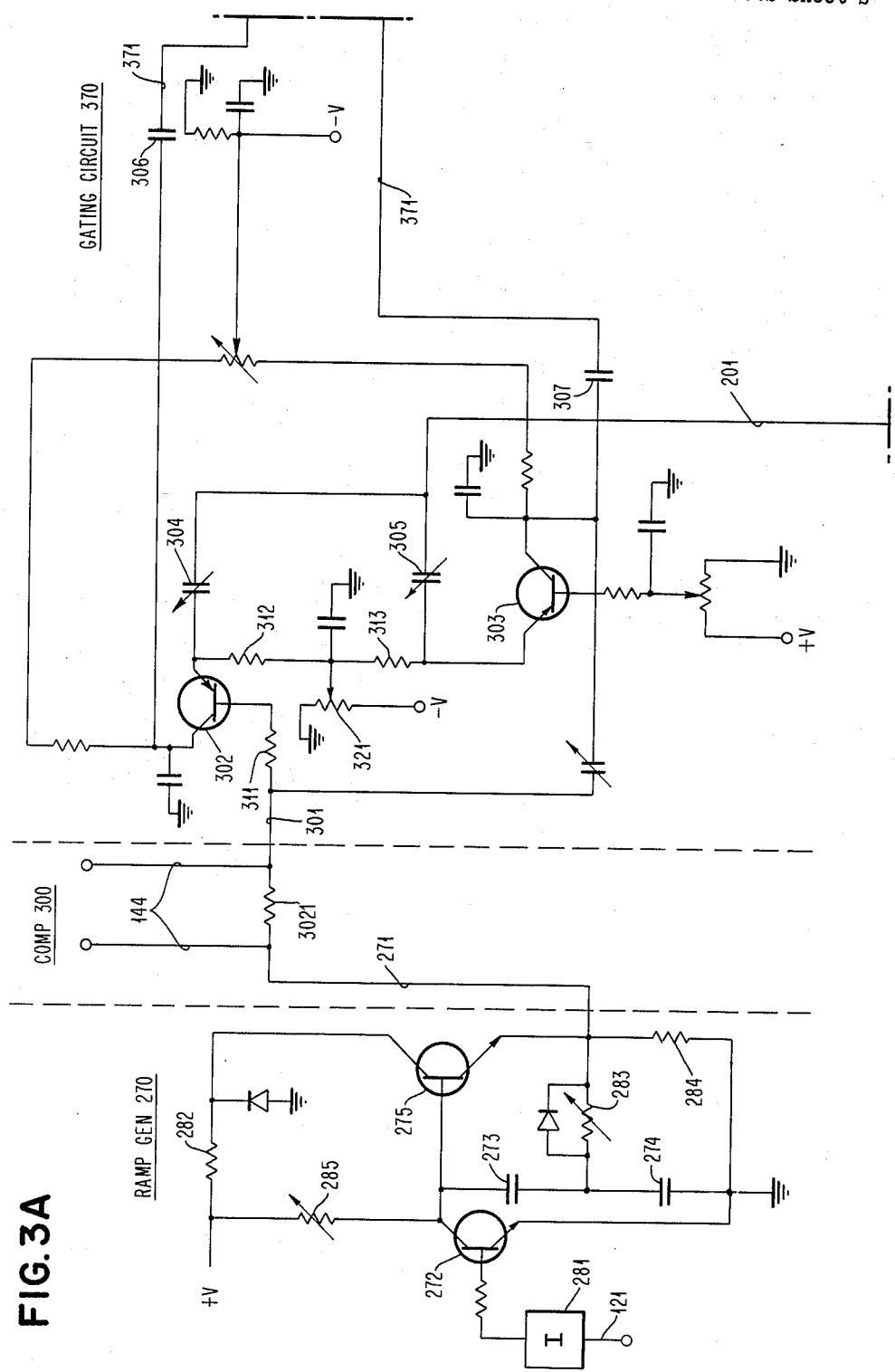

March 1, 1966 D. GORDON ETAL 3,238,449
PULSE COMPARING DEVICE FOR DIGITAL MEASUREMENT OF SIGNAL SHAPE
Filed Dec. 27, 1961 4 Sheets-Sheet 3
FIG. 3B
FIG. 3D
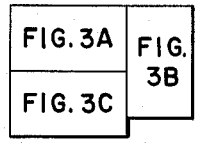
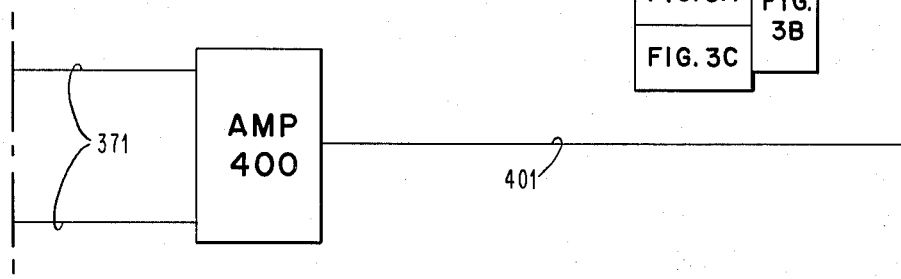
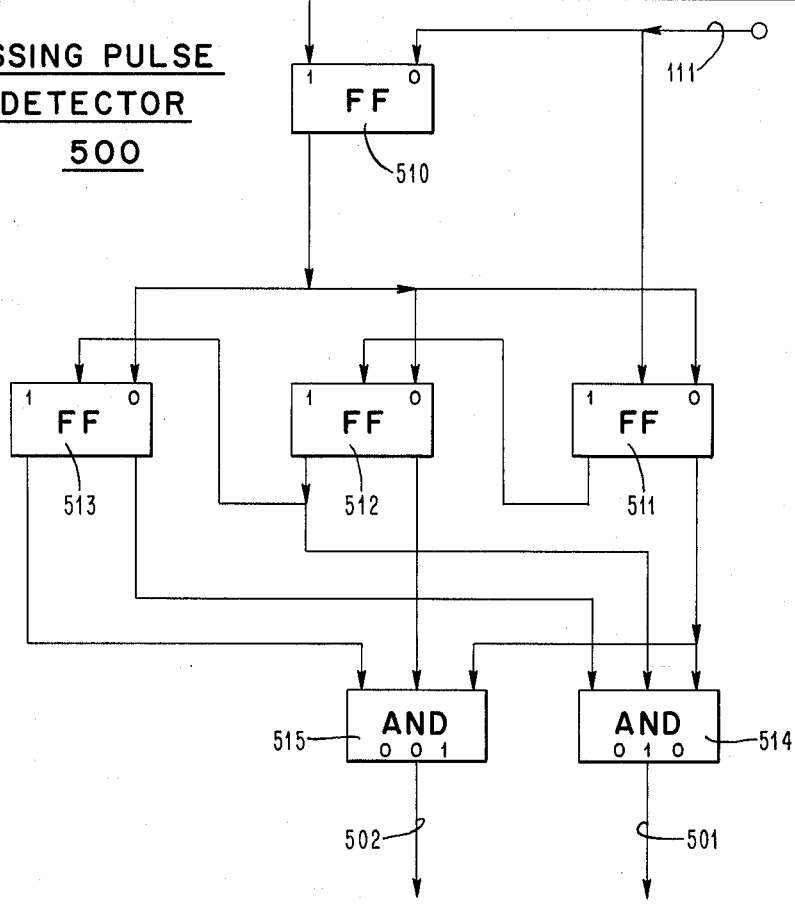

March 1, 1966     D. GORDON ETAL     3,238,449
PULSE COMPARING DEVICE FOR DIGITAL MEASUREMENT OF SIGNAL SHAPE
Filed Dec. 27, 1961

United States Patent Office 3,238,449
Patented Mar. 1, 1966

3,238,449
PULSE COMPARING DEVICE FOR DIGITAL
MEASUREMENT OF SIGNAL SHAPE
David Gordon, Hurley, and Malcolm A. Sanborn, Endicott, N.Y., assignors to International Business Machines Corporation, New York, N.Y., a corporation of New York
Filed Dec. 27, 1961, Ser. No. 162,442
8 Claims. (Cl. 324—57)

The present invention is directed to apparatus for measuring the characteristics of an electrical signal, and is useful in measuring a signal produced by a device which can be repetitively operated to produce signals of like form and duration.

In the electrical art, it is sometimes desirable or even necessary to make an accurate determination of certain characteristics of a signal produced by a component or device. In those instances where the envelope and/or power inherent to a signal is to be determined, a traditional approach has been to determine the instantaneous amplitude of the signal being examined at each of time intervals which usually are uniformly spaced apart from each other by a known amount (and which may be referred to hereinafter as "slots") throughout the duration of the signal, and to use the values so obtained for purposes such as generating a profile and determining the area lying under the curve which defines the observed signal. Measuring techniques of this kind may be employed in testing apparatus; for instance, apparatus for testing ferrite cores, where the acceptability of a component or device may depend on its performance as measured in terms of its ability to produce an output signal having particular characteristics or parameters.

In the past, signal analysis equipment using the above-outlined approach usually has employed apparatus which compares the instantaneous amplitude of the observed signal falling within a particular time slot to the amplitude of a sample pulse. By holding the time slot choice constant and varying the amplitude of the sampling pulse as the device under test is repetitively operated, the amplitude of the signal at the selected time slot is determined when the amplitude difference between the two signals is zero. Instantaneous amplitudes so obtained then may be used to generate a profile, added in an integrating operation, or in any desired manner.

While this technique is suited to those instances where the signals to be analyzed are relatively long duration and change relatively slowly with respect to time, it has been found, particularly in the areas of testing ferrite cores on a production basis (i.e., where the number of cores tested is high), that the technique is not adequate as the duration of measured signal approaches the width of the sampling pulse, because the number of time slots is reduced. Moreover, present practical techniques of generating pulses of width sufficiently narrow to give an acceptable number of time slots are such that the imposition of requirements of narrow pulse width, accurate selection of time slot, and closely controlled pulse amplitude may be expected to result in a combination too sensitive to its environment to yield reliably accurate results.

Accordingly, it is an object of the present invention to provide a new and improved apparatus for examining electrical signals.

Another object of the invention is to provide new and improved apparatus for examining signals produced by a repetitively operable device, which device is capable of producing signals of consistently uniform shape and duration.

Another object of the invention is to provide new and improved apparatus capable of deriving the instantaneous amplitude at a selected time slot, where the sampling pulse used to select the time slot is independent of the amplitude determining operation.

Another object of the present invention is to provide a new and improved apparatus particularly adapted for examining signals produced by each of a large number of similar devices.

The present invention is to be practiced with the device which is repetitively operative to produce at an output consistently uniform signals. In accordance with the principles of the invention, there is provided means including a clock for repetitively operating the device in order to cause that device to produce a number of signals of like shape with respect to a reference level and of like duration. There also is provided ramp means for producing a signal which increases from the above-named reference level to an amplitude greater than the maximum amplitude of the observed signals over an interval marked by the occurrence of the above-mentioned operations of the device. Comparing means coupled to the device output and to the ramp signal generator means subtracts the amplitude to the ramp signal from the amplitude of the observed signal and is effective for producing a continuing signal proportional to the difference resulting from the subtraction operation. There is further provided output means responsive to the difference indicating signals produced by the comparing means effective for producing uniform signals, each of which represents the existence of such a remainder signal.

In order to convey signals from the comparing means to the difference responsive means, there is provided gating means operable for coupling the comparing means to the above-mentioned difference signal indicating means. The gating means is operative under the control of strobing equipment coupled to the clock means in parallel with the above-mentioned device. The strobing means is enabled by the clock means each time the device under test is operated, and is effective during a selected time slot within each observed signal produced by the device for rendering operative the above-mentioned gating means.

With this arrangement, a train of signals produced by the output means at any selected time slot within successively occurring signals from the device under test may be applied to a utilizing device, such as a counter, in order to determine the number of difference indicating signals generated. It is to be seen that for any given time slot, the number of generated difference indicating signals (bits) produced by the output means is representative of the amplitude of the observed signal at the selected time slot.

The foregoing and other objects, features and advantages of the invention will be apparent from the following more particular description of the preferred embodiment of the invention, as illustrated in the accompanying drawings.

FIGS. 3A and 3C show in schematic form circuits employed in ramp generator, comparator, and gating and strobe circuits suitable for incorporation in FIG. 1.

FIG. 3B shows a block schematic of a differential amplifier and a missing pulse detector.

FIG. 3D shows the order in which FIGS. 3A, 3B, and 3C are to be arrayed.

*Drawing conventions*

Figure 1:
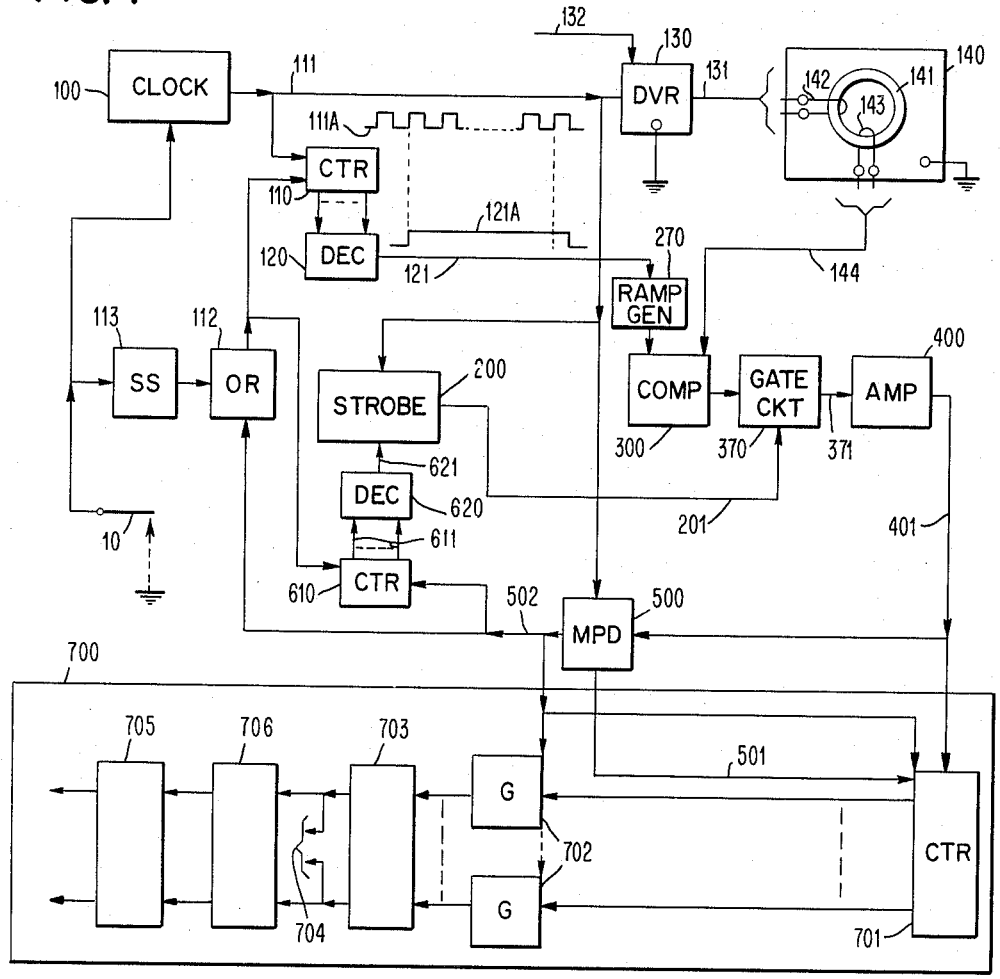
FIGURE 1 shows in block schematic form apparatus for examining the form of signals produced by a ferrite core under test.
Figure 1:
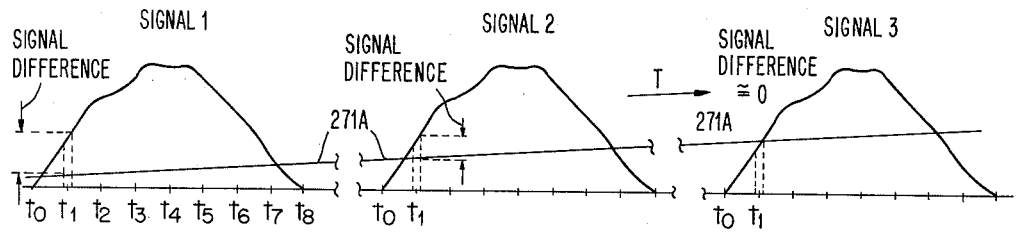
Figure 3C:
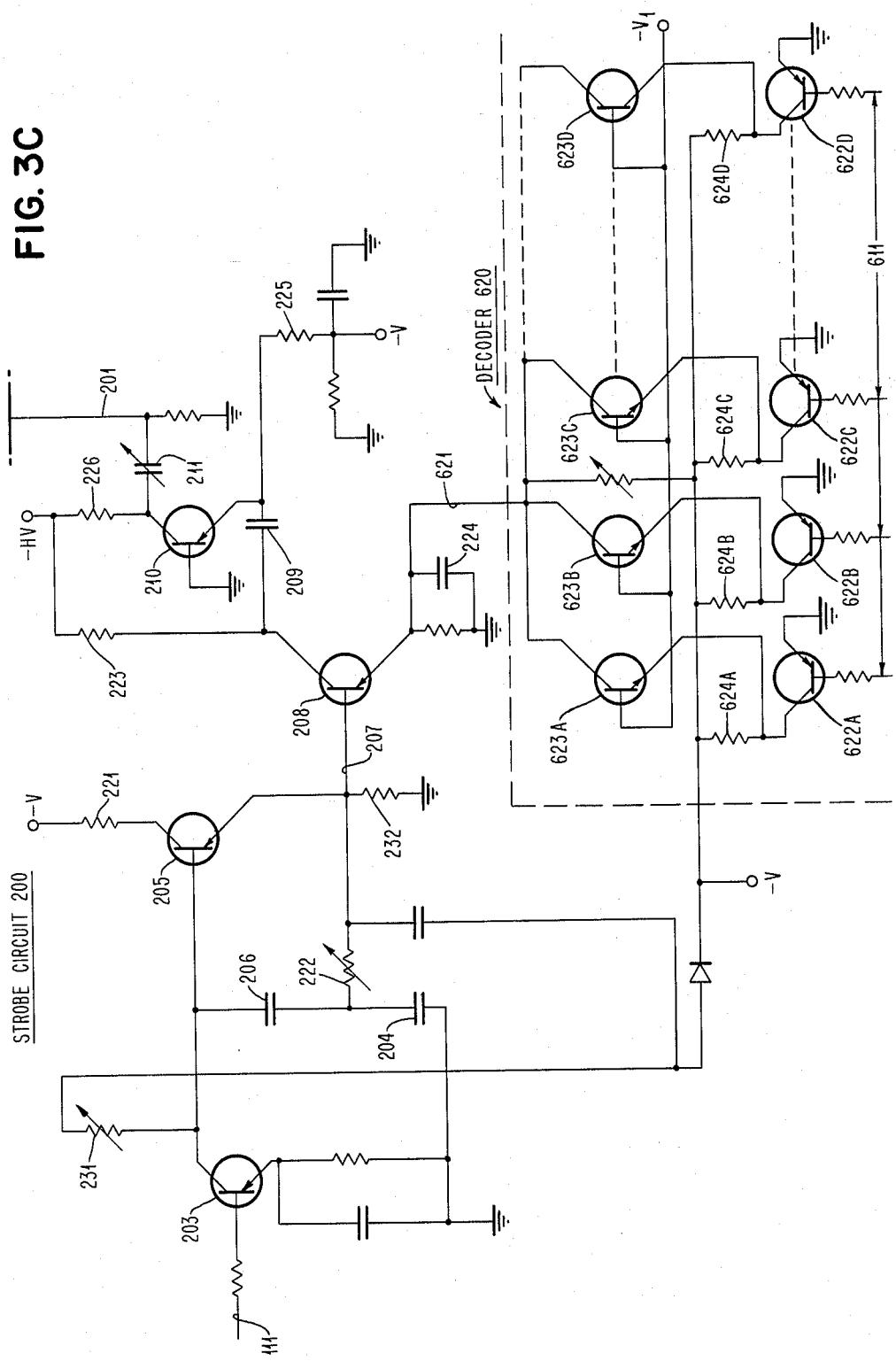

In the block schematic diagram of FIGS. 1 and 3B, the next explained series of conventions is employed. An arrowhead on a lead or conductor indicates (1) circuit connection energization with a pulse or level and (2) the direction of information transfer. No distinction between pulses and levels is shown in the drawing. However, such distinction exists and will be readily apparent to those skilled in the art, especially in the light of the use to which the circuit or component shown in the drawings in put.

Within FIG. 3B the components shown in block form are identified by bold-face characters appearing within such blocks which represent the common name of the component. For instance, FF designates a flip-flop, AND a logical AND circuit, OR a logical OR circuit, and SS single shot multivibrator. A variety of circuits suitable for the performance of each of these logical functions is known to the art. For instance, the book entitled "Pulse and Digital Circuits" by Jacob Millman and Herbert Taub published in 1956 by McGraw Hill Book Company, Inc., shows and generally describes flip-flops in chapter 5. Similarly, mono-stable multivibrators (single shot); AND and OR circuits; and a discussion of transistor technique as applied to such circuits are found in chapters 6, 7, and 18, respectively, of the same reference. The differential amplifier shown in FIG. 3 may be of any acceptable type, such as the one shown and described.

*General description*

Referring to FIG. 1, the system is placed in operation by any suitable means, such as the manual operation of switch 10. Upon the closing of switch 10, a signal is supplied over an obvious path to the inputs of clock 100 and single shot 113.

Clock 100 is of any of a number of well known types and is effective so long as switch 10 is closed for producing on its output 111 continuing square wave signals of the type indicated in the figure as 111A. The closing of switch 10 also is effective for operating single shot 113, which is thereupon effective for producing a single output pulse. The latter pulse is transmitted via OR circuit 112 to the reset inputs of counters 110 and 610, respectively. These counters may be of any of a number of well known types and each has the above-mentioned reset and another, add one input. In this manner, elements of each counter are reset to zero at the outset of system operation in anticipation of receipt of pulses to be later applied to the add one input of that counter.

The add one input of counter 110 is coupled directly to output 111 of clock 100, so that subsequent to the above-mentioned resetting operation of counter 110, the number of pulses produced by clock 100 on conductor 111 is reflected by the combination of signals on counter 110 output conductors which are collectively indicated as 114. Decoder 120, which is controlled by signals present on conductors 114 also is of any of a number of well known types and is arranged in such a manner that immediately upon resetting of counter 110 no signal is produced on its output conductor 121, but so that signals on conductors 114 upon the registration of any count other than zero in counter 110 is effective to produce a signal (significant level) on output conductor 121. Thus, it is to be seen that a signal (represented in FIG. 1 as 121A) is present on conductor 121 upon the occurrence of the first pulse on conductor 111 produced after counter 110 has been cleared. The time relationship between the pulses 111A conveyed over conductor 111 and the signal 121A is indicated in FIG. 1. It is to be seen that signal 121A marks or defines a number or "frame" of 111A pulses. The manner in which the signals on conductors 111 and 121 are used is described in the following paragraphs.

*Driving the device under test.* — For purposes of demonstration it is assumed that the device to be observed is a ferrite core, 141, which has been suitably connected within a test fixture generally indicated as 140 in the drawing. Within fixture 140, a first (drive) winding 142 of the core is coupled to the output of driver 130. Similarly, the output winding 143 is coupled to fixture 140 output conductors (shown in FIG. 1 as 144) for the purpose of conveying to other apparatus signals produced by core 141.

Driver 130 is of any of a number of well-known types. It has an input coupled to conductor 111 and is of a type which can be selectively set in accordance with control signals applied to an input indicated in the drawing as 132, with the result that a number of pulses on conductor 111 cause driver 130 to produce a like number of driving pulses which are substantially identical to each other. Each of the latter pulses is effective to drive core 141 between a first and an opposite flux state and therewith cause core 141 to produce output pulses on conductor 144. It is to be understood that since the signals on conductor 131 produced by driver 130 remain constant for a selected setting of driver 130, the output pulses or signals produced on conductor 144 by core 141 also are substantially identical to each other in shape and duration. The latter pulses are to be referenced to a ground level common to all equipment and indicated by a conventional ground symbol in the drawings.

It is to be further understood that driver 130 may be selectively controlled by manipulation of apparatus (not shown in the drawing) which, in turn, furnishes selected signals to input 132, therewith controlling the shape and duration of pulses produced on conductor 131. With this type of control available, it is to be seen that conditions under which core 141 are tested can be varied.

*Operation of the comparator.*—Each of the various signals produced on conductor 144 by a frame of conductor 111 pulses is to be compared to a reference voltage generated on output 271 of ramp generator 270. The signal on conductor 271 starts (in a manner to be described presently) at the beginning of the frame of conductor 111 pulses and continues to increase linearly with respect to time throughout the frame. To this end, the input of ramp generator 270 is coupled to a decoder 120 output conductor 121. Consequently, when the start of a frame on pulses of conductor 111 is indicated by the presence of a signal on conductor 121, the signal on conductor 271 starts its rise from ground level, the rise continuing until the end of the frame is indicated by the removal of the signal from conductor 121 in the previously described manner. At the last named time, the signal on conductor 271 returns to ground level in anticipation of receipt of the next frame of impulses from clock 100.

Figure 2:
FIG. 2 shows a representation of signals generated by a core under test and by a ramp generator.

Comparator 300 has a first and second inputs to which conductor 144 and 271, respectively, are coupled. Comparator 300 is effective to subtract the amplitude of the signal from ramp generator 270 from the amplitude of the various core 141 output signals and to generate on output conductor 301 a continuing signal of amplitude proportional to remainder (i.e., result of) the subtraction operation taking place within comparator 300. Referring to FIG. 2, there are shown profiles representing the amplitude of several signals derived from certain ones of clock pulses of the same frame and produced on conductor 144 plotted against time. These are labeled Signal 1, Signal 2 and Signal 3. Also shown in FIG. 2 is curve 271A, representing the amplitude which the output signal of ramp generator 270 may follow during a like time interval. Thus, it is seen that signal 271A may increase from ground level to a value (not shown in FIG. 2) which is substantially greater than the maximum amplitude of signals present on conductor 144.

*Sampling the output of the comparator.*—The continuing signal on output 301 representing the difference between the amplitudes on signals on conductors 144 and 271 is delivered to the signal input of gate means 370, which also receives at its sampling input 372 pulses from strobe circuit 200. Each of the pulses from circuit 200 is produced (in a manner hereinafter described) at one of a number of selected time slots lying within the duration of each of the conductor 144 signals.

Again returning to FIG. 2 and the example chosen for illustration, it is assumed that the above-mentioned time slots are of equal duration and that it is desired to generate a series of pulses representing the amplitude of a particular time slot identified in the drawing as $t_1$. Strobe circuit 200, which is synchronized with clock 100 by the receipt at its input 202 of pulses from conductor 111, is effective for delivering the sampling pulse within the selected time slot, $t_1$, to an input of gate means 370, therewith making gate means 370 pass a sample of the signal present on conductor 301 at the instant of occurrence of the sampling pulse. From FIG. 2, it is to be seen that such a pulse is present during the occurrence of the conductor 144 signals labeled 1 and 2, but, since the value of signal 271A and the instantaneous value of the conductor 144 signal at time $t_1$ of signal 3 are substantially equal, the third sample output on conductor 371 is substantially zero and the start of a "null point" in the comparison operation is defined. The operation of strobe circuit 200 and comparator 300 continues. However, the slope of signal 271A (i.e., $dE/dt$) is of small enough value to insure the absence of three or more consecutive output signals upon the sampling of gate 370 in the region of the above-mentioned null point.

*Preparing differential signals for counting.*—From the discussion thus far, it is to be seen that within any given frame of conductor 111 clock pulse, each of the signals delivered to the above-described output conductor 371 or gating means 370 represents the existence of a difference between the instantaneous voltage at a selected time slot within one of the uniform shape and amplitude pulses delivered on conductor 144 and the amplitude of the ramp signal delivered on conductor 271, so that the number of such pulses in the train delivered prior to the occurrence of the above-described null point represent the instantaneous pulse amplitude within the time slot currently selected by strobe circuit 200. Further, it is to be seen from the above description that the time delay inherent to driver 130, core 141, comparator 300, and gating means 370 assures that each such pulse issuing on conductor 371 occurs some time following the start of clock pulse 100 from which the pulse on conductor 371 is derived. In order to make the pulses of such a train uniform amplitude, they are applied to the input of difference amplifier 400, which is effective for amplifying all such input signals, clipping the amplified signals to uniform level and presenting the uniform level signals (or bits, as they may now be referred to) on output conductor 401. The trains of pulses generated for each or any of the above-mentioned time slots may be analyzed in the manner set forth in a following section:

*Detecting a null.*—From the foregoing description, it is to be seen that within any train of pulses produced on conductor 401, each such pulse is derived from and therefore corresponds to a particular conductor 111 clock pulse. Further, upon the occurrence of a null condition within comparator 370, such null condition is marked by the failure of 300 and amplifier 400 to produce a bit on each of the occasions marked by the occurrence of several consecutive pulses on conductor 111. Control signals generated upon this happening may be used to direct analyzing apparatus which is driven from the output bits on conductor 401 and to otherwise control the operation of the system.

In order to detect such missing pulses on conductor 401, conductor 401 is connected to a first input of missing pulse detector 500 and conductor 111 is connected to a second input of the same detector. Detector 500 is effective in response to the alternate receipt of pulses on conductors 111 and 401 for withholding signals from its output conductors 501 and 502; similarly, detector 500 is effective upon the occurrence of two and three pulses on conductor 111 without the occurrence of intervening pulses on conductor 401 for producing an output pulse on each of conductors 501 and 502, respectively. The pulses on conductor 501 are used to directively control the selection of time slots by strobe circuit 200, while pulses on conductor 502 are used to direct the operation of analysis equipment 700.

*Selection of strobe time.*—From the above description, it is to be recalled that strobe circuit 200 is effective for selecting a time slot within each of the above-mentioned signals occurring on conductor 144 and for producing a pulse at such times for operating gating means 370. In order to effect the selection of a particular time slot, there is provided binary counter 610, which, it will be recalled, has been reset at the outset of system operation. In order to advance counter 610, its add one input is coupled to output 502 of missing pulse detector 500. As a consequence, the number registered in counter 610 indicates the identity of the time slot in the signals on conductor 144 currently being measured by the apparatus including comparator 300, if it is assumed for the moment that each such pulse on conductor 502 marks the end of measurement of a unique one of the signal time slots.

The outputs of counter 610 collectively indicated as 611 (and on combinations of which there appears signals in accordance with the value of count registered within 610) are coupled to the input of decoder 620.

Decoder 620 is effective in response to the various combinations of signals applied to its input for producing on its output conductor 621 a signal the amplitude of which is stepped to a level below ground, the level varying by a fixed amount with respect to an immediately preceding and succeeding levels as counter 610 is advanced from its reset position by pulses received over conductor 502. The signal on conductor 621 is applied to the input of strobe circuit 200 and is effective in a manner to be described in greater detail for making strobe circuit 200 operative to produce a signal on its output 201 coincident with the occurrence of a particular time slot in each of the signals on conductor 144, the time slot being selected in accordance with the step level of the signal on conductor 621.

In order to complete the time slot selection process, the output signal on conductor 502 from missing pulse detector 500 is applied via OR circuit 112 to the reset input of counter 110. Thus, at the same time that strobe circuit 200 is made operative to select the next adjacent time slot in the conductor 144 signals, counter 110 and its slave decoder 120 are made effective to define the start of a new frame of clock 100 figures on conductor 111 by removing the signal from conductor 121 and the input of ramp generator 270. Consequently, the first pulse on conductor 111 in the next occurring frame of such pulses causes decoder 120 to restart ramp generator 270 with the previously described effects.

*Using output bits.*—Returning to the consideration of pulse trains produced on conductor 401, the fact is reiterated that the number of bits in any one train represent a measure (in assignable values of units) of the amplitude of the particular time slot at which the train of pulses is unique. From the above description, it is to be seen that such trains are generated on output 201 in the sequence in which the time slots of the signals under test occur. The manner in which these pulses may be used in analyzing equipment 700 is next discussed.

Assuming that prior to the receipt of any pulse train on conductor 401, counter 701 within equipment 700 has been reset by virtue of the application of a pulse to its reset input from conductor 502 of the above-described detector 500, it is to be seen that the receipt of the next following pulse train of conductor 401 may be directly applied in the manner indicated in the drawing to the add one input of counter 701. In this manner, the number of pulses in the train are registered in counter 701.

The number so registered may be used in a variety of ways for purposes of analyzing characteristics of signals produced by examined core 141. For instance, in the case chosen for illustration, upon the production of a pulse on conductor 501, an inhibit input of counter 401 is energized, making counter 701 non-responsive to further pulses on conductor 401. The subsequently generated end-of-frame pulse on conductor 502 samples the outputs of counter 701 at gates 702, so that the bits derived from this sampling operation applied to the input of a register, such as 703. Subsequent to the registration of the count in register 703, the data so registered may be taken off for preservation of conductors indicated collectively as 704, and may be combined with other such count in register 705 by operating adder circuit 706. Since the use to which the various instantaneous amplitude data are put does not form a part of the present invention, the apparatus of element 700 is not described in further detail.

*Summary of the general description.*—From the foregoing sections it is to be seen that upon the production of a first series of pulses on conductor 144 after switch 10 has been operated, strobe circuit 200 is made effective for sampling during the first time slot in each such conductor 144 signal, so that samples are derived at the first time slot from the continuing difference signals generated in comparator 300 by subtracting the increasing amplitude of ramp signal 271A from the amplitude of each conductor 144 signal at time slot 1 the number of difference indicating samples being manifested as a train of pulses on output conductor 401. The end of the train of output pulses, i.e., the occurrence of the number of pulses representing the instantaneous amplitude of the observed signals at the first time slot, is determined by detecting in circuit 500 the occurrence of several consecutive pulses on conductor 111 without an intervening conductor 401 pulse. At such a time indicator 500 is effective for generating an end of frame output signal on its conductor 501, which signal advances register 610 in order to increase by one the value of the count registered therein. Counter 610 in turn causes decoder circuit 620 to modify the condition of strobe circuit 200 in a manner such that circuit 200 is effective to sample the output of comparator 300 in the next adjacent time slot of all signals next produced on conductor 144. In this manner, successive trains of pulses are generated on conductor 401 until pulse trains representing the instantaneous amplitude of the measured signals in all time slots have been generated.

*Detailed description of circuits*

While certain of the components shown in FIG. 1 are of types well known to those skilled in the art, such as clock 100 and counters 110 and 610, other circuits including strobe circuit 200, ramp generator 270, comparator 300, gating circuit 370, and missing pulse detector 500 are special to the preferred embodiment of the present invention and therefore are described in the following sections in the detail sufficient to an understanding of the present invention. In the following sections, it is assumed that all signals are positive going unless otherwise stated.

*Ramp generator 270.*—Referring to FIG. 3A, the appearance of a significant level (signal) on conductor 121 is effective to drive the output of inverter 281 from its normal, positive level to a more negative level, and therewith drive the base of NPN type transistor 272 negative with respect to its emitter. For this reason, transistor 272 changes from its normally low impedance to high impedance between its emitter and collector. This increase of impedance raises the voltage on the base of NPN type transistor 275 from its normal level to a level more positive with respect to its emitter. As a result, the normally high impedance of the emitter-controller circuit of transistor 275 is reduced.

As the result of increasing and lowering the emitter-collector impedance of transistors 272 and 275, respectively, current is admitted from source +V via resistor 285 to the serially connected capacitors 273 and 274 and to the base of transistor 275. Consequently, the current in the emitter-collector circuit of transistor 275 follows the voltage rise at the transistor's base. As the voltage at the center tap of capacitors 273 and 274 rises with the rise of voltage at the emitter of transistor 275, the voltage across resistor 284 and on output conductor 271 rises at a linear rate with respect to time.

The change of signal on conductor 121 from the above described positive to its normal, negative value (which marks the end of a frame of clock 100 pulses), causes the output of inverter 281 to return to its normal, positive level, therewith restoring the base of transistor 272 to its positive relationship with respect to the level of its emitter. Consequently, the emitter-collector impedance of transistor 272 is lowered to its normal level, discharging capacitors 273 and 274 and making the base of transistor 275 return to its normal relationship with respect to the level of its emitter. Consequently, the emitter-collector impedance of transistor 275 is restored to its normal, high value, and capacitor 274 discharges via capacitor 273 and the emitter-collector circuit of transistor 272 and via network 283 and resistor 284. For this reason, the amplitude of the signal on conductor 271 returns to zero at the end of the discharge of capacitor 274.

*Comparator 300.*—In order to subtract the increasing amplitude of the ramp signal on input conductor 271 from the amplitude of the predictably-occurring signals on conductor 144, signals incoming to comparator 300 over conductor 271 are passed through series resistor 3021 to output conductor 301. The conductors indicated generally as 144 in FIG. 1 and on which signals from core 141 are conveyed to the comparator are connected across resistor 302 in such order that voltages generated across 302 by the core 141 signals are in opposition to the polarity of the ramp signals present on conductor 271. With this arrangement, the increasing, positive signal on conductor 271 is subtracted from the negative going signals on conductor 141 and the continuing output signal present on conductor 301 is of amplitude proportional to the remainder. It is pointed out that while the ramp signal amplitude is smaller than that of the signals on conductor 144, this remainder is negative with respect to ground, and later shifts to a polarity which is positive with respect to ground when the amplitude of the signal on conductor 271 exceeds that of the conductor 144 signals.

*Gating circuit 370.*—The continuing difference signal generated in comparator 300 and produced on output conductor 301 is applied via resistor 311 to the bases of PNP type transistor 302 and 303, so that the signal to be sampled (i.e., the signal on conductor 301) is made to control the impedance of the emitter-collector circuits of transistors 302 and 303. Transistors 302 and 303 normally are maintanied non-conducting between collector and emitter by virtue of biasing voltage delivered from source —V through resistor 321 and resistor 312 and 313 to the emitter of each transistor. When a positive going sampling signal is provided to gating circuit 370 over conductor 201, such a signal is applied through capacitors 304 and 305 to the emitter of transistors 302 and 303, respectively. This positive going signal is of sufficient amplitude to drive momentarily the transistors into the non-saturated operating regions. Consequently, current delivered through the emitter-collector circuits at such time is proportional to the amplitude of the signal present on input conductor 301. The resulting pulse signal is of amplitude determined by the amplitude of the difference indicating input signal. This resulting pulse signal is delivered via capacitors 306 and 307 to the output in conductors indicated in FIG. 1 as 371 and is available to the input of the above mentioned amplifier 400.

*Strobe circuit 200.*—The signals on conductor 111 which are used to synchronize the operation of circuit 200 to each of the pulses appearing on conductor 144 are applied to the input of PNP type transistor 203 of a saw-tooth signal generator circuit which also includes transistor 205. In the presence of a positive going clock pulse of conductor 111, transistor 203 is switched from its normally conductive state between emitter and collector to a state where its emitter-collector impedance is raised to a high level. The resulting decrease in potential at the emitter of transistor 203 swings the base of transistor 205 negative with respect to its emitter, therewith reducing the impedance of the emitter-collector circuit of transistor 205. As a consequence of these changes in condition in transistors 203 and 205, serially-connected capacitors 204 and 206 charge from source —V via resistor 231. The increase in voltage across capacitor 204 and resistor 232 with respect to ground (which increase may be regarded as being substantially linear with respect to time) generates a ramp signal on conductor 207 which is applied over an obvious circuit to the base of avalanche-type transistor 208. Upon the removal of the positive going signal from conductor 111 at the end of the clock pulse under consideration, the emitter-collector circuit of transistor 203 is again turned on, therewith switching of the emitter-collector circuit of transistor 205 and allowing capacitor 204 to discharge. The discharge of capacitor 204 restores the voltage on conductor 207 and the base of transistor 208 to a level which is substantially zero with respect to ground.

PNP type transistor 208 to which the ramp signal on conductor 207 is applied is of the avalanche type, i.e., upon the exceeding of a threshold value of voltage between the emitter and base of the transistor, the emitter-collector impedance decreases rapidly in order to allow a sudden surge of current to flow in the circuit in which the emitter and collector are serially-connected. The normal, ground level signal on conductor 207 is positive with respect to the voltage normally present on the emitter and therefore is effective to maintain the emitter-controller of transistor 208 in its high impedance state. However, at some point during the increase of the previously described negative-going ramp signal on conductor 207, the base of transistor 208 goes negative with respect to its emitter, therewith allowing transistor 208 to "fire" (i.e., allow a surge of current to flow from a comparatively high voltage source, —HV, through resistor 223, the emitter-collector circuit of transistor 208, and capacitor 224 to ground.

Assuming that transistor 208 has fired at a particular time (for reasons yet to be described), the resulting sudden increase of voltage at the collector of the transistor is passed through capacitor 209 to the emitter of PNP type transistor 210, therewith driving the emitter from its normal, negative state to a point which is positive with respect to the transistor's grounded base. As a consequence, the impedance of the emitter-collector circuit of transistor 210 is lowered, allowing a surge of current to flow from —V through resistor 225, the emitter-collector of transistor 210, and resistor 226 to relatively high voltage source —HV. The rise of voltage at the collector of transistor 210 is passed as a positive going pulse through capacitor 211 to output conductor 201.

From the above description it is to be seen that the repetitive application of pulses from input conductor 111 to the base of transistor 203 results in a series of pulses of corresponding number on output conductor 201. Further, it is to be seen that each conductor 201 pulse occurs during the existence of the corresponding conductor 111 pulse, and that the exact point in time or "time slot" is determined by the level of significance on input conductor 621. From this, it is to be seen that selection of the time slot is a function of the signal level present on conductor 621.

*Decoder 620.*—From the immediately preceding section it is to be seen that it is necessary to control the level of signal on conductor 621 in order to fire transistor 208 during a particular time interval. It is the function of decoder 620 to achieve this control. From the preceding sections it is to be recalled that decoder 620 has multiple input conductors 611 on which there appear combinations of signal levels reflecting with counts registered from time to time in previously mentioned counter 610. In the preferred embodiment of the present invention, a "0" indicating signal on any one of conductors 611 is assumed to be negative with respect to ground, and a "1" indicating signal is assumed to be positive with respect to ground.

Each of the input signals to decoder 620 is applied over an obvious path to the base of one of decoder input transistors 622A, 622B, etc., all of which are PNP type. As a consequence, the application of a negative, "0," signal to any of these input transistor bases drives the transistor into saturation and therewith raises the voltage at the collector from some negative value to substantially ground level. Similarly a "1" indicating, positive signal on such a conductor 611 drives the corresponding decoder input transistor base beyond cutoff, therewith allowing the level of the signal on the collector to go to some negative value which is controlled by the flow of current from source —V through an appropriate one of resistors 624A, 624B, etc.

The ground level signal supplied at the collector of each of the above described input transistors is effective in an obvious manner to drive the corresponding one of output transistors 623A, 623B, etc., beyond cutoff. As a result no current is supplied through the emitter-collector circuit of such a transistor to output conductor 621 at the time that a "0" is received on the corresponding decoder input conductor. However, the removal of the cutoff, ground level signal from the emitter of an output transistor, such as 623A, allows that emitter to swing negative with respect to its base. Consequently, the current flowing through the emitter-collector circuit of such an output transistor is regulated by the value of the resistor, such as 624A, which is in series with the emitter and collector.

It is to be seen that by choosing the values of resistors 624A, 624B, etc., in accordance with the order of the decoder input 611 to which the resistors correspound, the output signal developed by the various output transistors 623A, 623B, etc. is a stepped function, any step level of which is displaced from the next higher and next lower steps, with the level with respect to ground being proportional to the value of the count currently registered in counter 610.

*Missing pulse detector.*—Referring to FIG. 3B, the first pulse of a train on output conductor 401 is applied to the one input of flip-flop 510, therewith shifting that flip-flop to its "1" state. From the previous description of detector 500, it is to be recalled that for each pulse in a train on conductor 401, an intervening clock pulse occurs on conductor 111. The latter is coupled to the 0 input of flip-flop 510, so that a pulse thereon shifts flip-flop 510 from its 1 to its 0 state. With this arrangement, it is to be seen that during the receipt of a train of impulses on conductor 401, flip-flop 510 is shifted between its 0 and 1 states upon the receipt of alternate pulses on conductors 111 and 401, respectively.

Each time the flip-flop 510 is shifted to its 1 state, flip-flops 511, 512, and 513 of a counter are reset by the significant signal appearing at such time on the 1 output conductor of flip-flop 510, because the latter is directly coupled to the 0 inputs of 511, 512 and 513. Conductor 111 also is coupled to the complement input of the first flip-flop 511 in the above-mentioned counter. As a result of the configuration of inputs to flip-flop 511, only flip-flop 511 of the counter is shifted to its 1 state by the clock pulses, so long as alternate pulses are received on conductors 401 and 111, because all counter flip-flops are reset to 0 each time a conductor 401 pulse is received.

In the case where several clock pulses occur on conductor 111 without intervening conductor 401 output pulses, it is to be seen that flip-flop 510 remains in its 0 state and that the normally energized reset inputs of flip-flops 511, 512 and 513 of the counter are not energized in the above-described manner. Consequently, the flip-flops of 511, 512 and 513 of the counter are effective in the normally expected manner to step in the normal manner and register the number of consecutive pulses on conductor 111. Thus, at the end of the first pulse, flip-flop 111 is shifted to its 1 state. At the end of the second pulse flip-flop 512 is shifted to its 1 state and flip-flop 511 at 0 state. At the end of the third of conductor 111 pulses, flip-flop 512 is maintained in its 1 state and flip-flop 511 is recomplemented to its 1 state. At the end of the fourth impulse both flip-flop 511 and 512 are recomplemented to 0 state and flip-flop 513 is complemented to its 1 state.

AND circuits 511 have inputs coupled to selected ones of the outputs of the counter flip-flops. For instance, the inputs of AND circuits 514 are conditioned from the 0, 1, and 0 side of flip-flops 511, 512 and 513, respectively. Under these conditions, it is to be seen after the second consecutive pulse on conductor 111 inputs of AND circuit 514 are "up" to cause circuit 514 to produce a significant signal on the output 501. Similarly, the inputs of AND circuit 515 are connected to the 0, 1, and 1 outputs, respectively, of counter flip-flops 511, 512 and 513, respectively. As a consequence, it is to be seen that AND circuit 515 is effective for producing on its output conductor 502 pulse at the end of the third consecutive pulse on conductor 111.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In apparatus for examining characteristics of a signal produced at the output of a device, where the device is repetitively operable to produce constantly uniform signals at said output,
    clock means for repetitively operating said device and therewith causing said device to produce a series of signals of like time duration and shape with respect to an arbitrary level,
    means operative during the interval marked by a number of operations of said clock means for generating a ramp signal of amplitude which increases from a reference level at a rate substantially linear with respect to time,
    comparing means coupled to said device output and to said ramp means for subtracting the amplitude of said ramp signal from the amplitude of the various signals produced by said device, and for producing a continuing signal of amplitude proportional to the remainder derived from the subtraction,
    output means responsive to a signal from said comparing means for producing a signal representing the existence of remainder,
    gating means operable for coupling said comparing means to said output means,
    strobing means coupled to and operative in synchronism with said clock means for rendering said gating means effective at any one of a plurality of time intervals within the duration of each signal produced by said device, and
    selecting means effective for making said strobing means operative at a selected time interval within the duration of each signal produced by said device,
    whereby the instantaneous amplitude at any desired time interval within the duration of signals produced by said device may be determined.

2. The apparatus set forth in claim 1 and having in addition means effective for controlling the operation of said selecting means,
    and means for causing said controlling means to direct said selecting means to be operative at each of a series of time intervals within the duration of signals produced by said device and further effective for reoperating said ramp signal generating means, whereby there are generated at said output device trains of signals with each train of signals representing the instantaneous amplitude at a unique time interval within the duration of signals produced by said device.

3. The apparatus set forth in claim 1 and having in addition counting means effective in each of a series of operations for causing said selecting means to direct said strobing means to operate at a corresponding one of a plurality of time intervals in the order of occurrence of such intervals within the duration of signals produced by said device, and
    detecting means repetitively operative for advancing said counting means through its series of operations and effective during each such operation for reoperating said ramp signal generating means,
    whereby there are generated by said output devices trains of signals, the trains of signals describing the instantaneous amplitude of successively occurring time intervals within the duration of the various signals produced by said device.

4. The apparatus set forth in claim 3 wherein said detecting means also includes means coupled to said output device operative for producing a signal at the end of each train of impulses produced thereby, and wherein said counting means is advanced and said ramp generating means reoperated in response to each signal produced by said detecting means,
    whereby signals produced by said output means are available for use within other, analyzing apparatus and are used for directing the timing of said strobing means to examine the amplitude of signals produced by said device.

5. In apparatus for examining the characteristics of a signal produced at the output of a device, where said device has an input and is repetitively operable in response to the application of signals thereto to produce consistently uniform signals at said output,
    means including a clock having an output coupled to said device input and effective for applying thereto uniform driving signals regularly spaced apart in time in order to cause said device to produce at its output signals of like time duration and profile with respect to an arbitrarily selected level,
    a signal generator operative over an interval marked by the occurrence of a number of signals produced by said clock for generating a ramp signal which increases in amplitude at a rate which is substantially linear with respect to time from a reference level,
    means operative at the outset of operation of said clock means for rendering said signal generator operative,
    differencing means coupled to said device output and to said signal generator for subtracting the amplitude of the ramp signal produced by said signal generating means from the amplitude of signals produced by said device and further effective for generating a continuing signal of amplitude proportional to the remainder resulting from the subtraction of said signals,
    means including an amplifier having an input and an output, said amplifier means being effective in response to the application of a signal to its input for producing a corresponding signal of fixed amplitude and duration on its output in order to represent the existence of a signal produced by said comparing means as one of a plurality of bit signals produced at said amplifier means output, a gating circuit having a signal input coupled to said differencing means output, an output coupled to said amplifier means input, and a conditioning input, said gating circuit being effective in response to the application of a signal to said conditioning input for passing signals from said differencing means to said amplifier means, strobing means having an input coupled to said clock means and an output coupled to said gating means conditioning input, said strobing means being operative in synchronism with each signal from such clock means for producing at a particular time within the duration of each signal produced by said device a signal which conditions said gating means in order to cause said amplifier means to produce a train of bit signals on its output, each bit signal in the train representing the existence of a difference between the instantaneous amplitude of signals produced by said device at the times said gating circuit is conditioned and the increasing amplitude of the signal from said generator, and means including a counter having an input coupled to said amplifier means output operative for registering the number of bit signals produced in a train by said amplifier means, whereby the count registered in said counter at the conclusion of the operation of said apparatus represents the instantaneous amplitude at a particular time interval within the duration of signals produced by said device.

6. The apparatus set forth in claim 5 wherein said strobing means includes a timing device having a first input coupled to said clock and a second input, said timing device being operative upon the receipt of a signal from said clock for thereafter producing a signal on such strobing means output after a time delay proportional to the amplitude of a signal applied to said timing device second input, and step means coupled to said timing device second input for producing a signal of controllable amplitude.

7. The apparatus set forth in claim 6 wherein said step means includes a slot counter and a decoder driven thereby, said decoder being operative for supplying a signal of amplitude proportional to the count registered in said slot counter to said timing device second input, means operative at the outset of operation of said examining apparatus for clearing said slot counter in order to reduce the amplitude of the signal produced by said decoder to a fixed minimum, and detecting means thereafter operative for advancing the count registered within said slot counter and for restarting the operation of said signal generator.

8. The apparatus set forth in claim 7 wherein said clock and said device are operative for producing signals in time-staggered sequence, so that bit signals produced on said amplifying means output alternate in time with certain signals produced by said clock, and having in addition within said detecting means apparatus operative in response to the receipt of successive clock signals without the receipt of intervening amplifying means bit signals to produce a signal on the output of said detecting means output.

References Cited by the Examiner

UNITED STATES PATENTS

| | | | |
|---|---|---|---|
| 2,895,784 | 7/1959 | Rocha | 328—146 X |
| 2,918,574 | 12/1959 | Gimpel et al. | 328—146 X |
| 3,034,055 | 5/1962 | Fine et al. | 328—151 X |
| 3,068,380 | 12/1962 | Lamoreaux | 324—34 X |
| 3,075,149 | 1/1963 | Marshall | 328—151 X |
| 3,140,477 | 7/1964 | Germain | 324—77 X |

OTHER REFERENCES

"Core Tester," IBM Technical Disclosure Bulletin, vol. 1, No. 2, August 1958, pp. 38 and 39.

WALTER L. CARLSON, *Primary Examiner.*

FREDERICK M. STRADER, *Examiner.*